(12) United States Patent
Suzuki et al.

(10) Patent No.: US 8,191,900 B2
(45) Date of Patent: Jun. 5, 2012

(54) OIL SEAL

(75) Inventors: Takao Suzuki, Numazu (JP); Sinichi Tamura, Susono (JP); Masaki Sohda, Funabashi (JP); Tetsuya Ishikawa, Hataya Omitama (JP); Takashi Umeki, Tokyo-to (JP)

(73) Assignees: Toyota Jidosha Kabushiki Kaisha, Toyota-shi, Aichi-ken (JP); Arai Seisakusho Co., Ltd., Tokyo (JP)

( * ) Notice: Subject to any disclaimer, the term of this patent is extended or adjusted under 35 U.S.C. 154(b) by 831 days.

(21) Appl. No.: 12/162,009

(22) PCT Filed: Feb. 20, 2007

(86) PCT No.: PCT/JP2007/053074
§ 371 (c)(1),
(2), (4) Date: Oct. 30, 2008

(87) PCT Pub. No.: WO2007/097320
PCT Pub. Date: Aug. 30, 2007

(65) Prior Publication Data
US 2009/0085301 A1    Apr. 2, 2009

(30) Foreign Application Priority Data

Feb. 21, 2006  (JP) ................ 2006-044085

(51) Int. Cl.
*F16J 15/16* (2006.01)
(52) U.S. Cl. ...................... 277/433; 277/553
(58) Field of Classification Search .......... 277/433, 277/553, 558, 424
See application file for complete search history.

(56) References Cited

U.S. PATENT DOCUMENTS

| 4,817,966 A | * | 4/1989 | Borowski ............ 277/424 |
| RE33,192 E | * | 4/1990 | Bainard et al. .......... 264/266 |
| 4,995,620 A | * | 2/1991 | Zawaski et al. ......... 277/377 |
| 5,297,804 A | * | 3/1994 | Siegrist et al. .......... 277/433 |
| 7,484,734 B2 | * | 2/2009 | Anderberg ............ 277/433 |

FOREIGN PATENT DOCUMENTS

| DE | 101 59 368 | 6/2003 |
| JP | 54-127968 | 9/1979 |
| JP | 56-23758 | 3/1981 |
| JP | 62-156667 | 10/1987 |
| JP | 63-2509 | 1/1988 |
| JP | 63-231068 | 9/1988 |
| JP | 64-55370 | 4/1989 |
| JP | 1-119972 | 8/1989 |
| JP | 6-14630 | 2/1994 |
| JP | 7-83333 | 3/1995 |
| JP | 7-127650 | 5/1995 |
| JP | 7-208610 | 8/1995 |
| JP | 10-339294 | 12/1998 |
| JP | 2001-254840 | 9/2001 |
| JP | 2004-132524 | 4/2004 |
| JP | 2005-48801 | 2/2005 |
| JP | 2005-147356 | 6/2005 |

* cited by examiner

*Primary Examiner* — Vishal Patel
(74) *Attorney, Agent, or Firm* — Finnegan, Henderson, Farabow, Garrett & Dunner, LLP (57) ABSTRACT

An oil seal (1A) has an outer member (2) fitted to a crankcase (100), an inner member (3) integrally rotatably fitted to a crankshaft (101), and a first movable lip (4) disposed in the gap (G1) formed by the outer member (2) and the inner member (3). The first movable lip (4) is disposed such that it is not in contact with the outer member (2) when rotation of the crankshaft (101) is stopped and that it is displaced in the direction to approach the outer member (2), coming into contact with the outer member (2) to close the gap (G1).

10 Claims, 10 Drawing Sheets

OIL SEAL

CROSS-REFERENCE TO RELATED APPLICATIONS

This application is a national phase application of International Application No. PCT/JP2007/053074, filed Feb. 20, 2007, and claims the priority of Japanese Application No. 2006-044085, filed Feb. 21, 2006, the contents of both of which is incorporated herein by reference.

TECHNICAL FIELD

The present invention relates to an oil seal disposed between a stationary body and a rotation body which is rotatably attached to the stationary body.

RELATED ART

Some oil seal which prevents leakage of fluid such as oil is provided with a movable floating ring in a prescribed gap between a rotation body and a stationary body, and is provided with a lip seal which is in contact with the stationary body to close the prescribed gap when rotation of the rotation body is stopped (Patent document 1).
[Patent document 1] JP2004-A-132524

SUMMARY OF INVENTION

Problems to be Solved by the Invention

In the oil seal of Patent document 1, the lip seal is displaced by centrifugal force in the direction to be separated from the stationary body as the rotational speed of the rotation body increases, the stationary body and the lip seal change from the state they are in contact with each other to the state they are not in contact with each other. Accordingly, frictional resistance between the stationary body and the lip seal is reduced. However, when the stationary body and the lip seal get in the state they are not in contact with each other as the rotational speed of the rotation body increases, leakage of oil may be provoked since the gap closed by the lip seal is opened.

Thus, it is an object of the present invention to provide an oil seal capable of preventing leakage of oil due to increase of the rotational speed of a rotation body.

Means of Solving Problems

In order to solve the above problem, the oil seal according to the present invention is an oil seal disposed between a stationary body and a rotation body which is rotatably attached to the stationary body; and includes an outer member fitted to the stationary body; an inner member which is integrally rotatably fitted to the rotation body and is assembled together with the outer member such that a prescribed gap is formed between the inner member and the outer member; and a movable member which is disposed in the prescribed gap, wherein the movable member is provided to the inner member such that it is not in contact with the outer member when rotation of the rotation body is stopped and that it is displaced in the direction to approach the outer member, coming into contact with the outer member to close the prescribed gap as the rotational speed of the rotation body increases.

According to this oil seal, the movable member that is not in contact with the outer member when rotation of the rotation body is stopped is displaced in the direction to approach the outer member, and comes into contact with the outer member as the rotational speed of the rotation body increases. Accordingly, frictional resistance is reduced, since the outer member is not in contact with the movable member until the movable member comes into contact with the outer member. Since the prescribed gap is closed after the movable member comes into contact with the outer member, leakage of oil dues to the increase of the rotational speed of the rotation body can be prevented reliably.

In the oil seal of the present invention, the movable member may be provided with a pressure receiving part which receives pressure in the internal space of the stationary body and urges the movable member in the approaching direction. According to this aspect, since the pressure receiving part receives pressure in the internal space, the movable member is urged in the direction to approach the outer member. Thus, sealing effect of the movable member of closing the prescribed gap is improved, since the movable member can be pressed against the outer member by using pressure in the internal space. In this aspect, the pressure receiving part may have a skirt which comes into contact with the outer member when the movable member comes into contact with the outer member. In this case, since the skirt facilitates the pressure receiving part to receive pressure in the internal space, the movable member can be pressed more strongly against the outer member. Furthermore, the skirt also comes into contact with the outer member, when the movable member comes into contact with the outer member. Accordingly, the contact between the movable member and the outer member becomes more tightly, and thus the sealing effect is improved further.

In the oil seal of the present invention, the gap between the movable member and the outer member may be provided such that labyrinth seal able to suppress leakage of oil is formed between the movable member and the outer member when the movable member is not in contact with the outer member. According to this aspect, even when the movable member is not in contact with the outer member, leakage of oil is suppressed by the labyrinth seal which is formed of the outer member and the movable member. Accordingly, leakage of oil can be prevented effectively over the speed range from a low rotational speed of the rotation body before the prescribed gap is closed by the movable member to a high rotational speed of the rotation body after the prescribed gap is closed by the movable member, without increasing number of parts.

In the oil seal of the present invention, the oil seal of the present invention may further include another movable member which is disposed in the prescribed gap, wherein the another movable member is provided to the inner member such that the another movable member is in contact with the outer member and the prescribed gap is closed when rotation of the rotation body is stopped, and the another movable member is displaced in the direction to be separated from the outer member such that the prescribed gap gets opened as the rotational speed of the rotation body increases. According to this aspect, by properly setting the displacement characteristics of the two movable members, respectively, the characteristics of the oil seal can be flexibly adjusted according to required characteristics.

In the oil seal of the present invention, a floating ring which is movable in no contact with both the outer member and the inner member may be disposed in the prescribed gap. According to this embodiment, labyrinth seal can be formed easily without setting the narrow width of the prescribed gap. Accordingly, leakage of oil can be prevented effectively over the speed range from a low rotational speed of the rotation body before the prescribed gap is closed by the movable member to a high rotational speed of the rotation body after the prescribed gap is closed by the movable member, without increasing the frictional resistance.

In the oil seal of the present invention, the movable member may have a contact part which comes into contact with the outer member; and the contact part may be formed of low friction material having lower friction coefficient than that of the other parts thereof. Furthermore, the outer member may have a contact part which comes into contact with the movable member; and the contact part may be formed of low friction material having lower friction coefficient than that of other parts thereof. In these cases, the resistance to pressure of the oil seal is improved, since the movable member can be pressed more strongly against the outer member while suppressing the increase of the frictional resistance.

In a case that the movable member has such a contact part, the contact part may have a low friction region formed of low friction material and an elastic region formed of elastic material having lower stiffness than that of the low friction material. The low friction region and the elastic region may be disposed respectively on the contact part such that, as the rotational speed of the rotation body increases, the movable member changes from the state the low friction region of the movable member is in contact with the outer member but the elastic region of the movable member is not in contact with the outer member to the state that both the low friction region and the elastic region of the movable member are in contact with the outer member. According to this aspect, the frictional resistance between the outer member and the movable member can be reduced when the outer member is in contact with the low friction region but the outer member is not in contact with the elastic region. Then, when the rotational speed of the rotation body increase further than that state, pressure in the internal space of the stationary body increases, however; sealing characteristics is improved since the outer member is in contact with both the low friction region and the elastic region. Accordingly, leakage of oil can be reliably prevented, for example, even when pressure in the internal space 100 becomes extraordinarily high for any reason. At the same time, intrusion of foreign matter from outside can be prevented, too.

Furthermore, the outer member may be provided with an auxiliary elastic part which opposes to the contact part of the movable member and may be formed of elastic material having lower stiffness than that of the constituent material of the outer member. The movable member may be displaced such that the contact part comes into contact with the auxiliary elastic part as the rotational speed of the rotation body increases. In this case, sealing characteristics is improved when the movable member is in contact with the outer member with the auxiliary elastic member interposed therebetween, since the auxiliary elastic part is formed of elastic material having lower stiffness than that of the constituent material of the outer member. Furthermore, since the auxiliary elastic part is provided to the stationary outer member, the increase of the weight of the movable member can be avoided. Thus, sealing characteristics can be improved while keeping the response of the movable member.

In the oil seal of the present invention, the another movable member may have a contact part which comes into contact with the outer member, and the contact part may be formed of low friction material having lower friction coefficient than that of the other parts thereof. According to this aspect, the frictional resistance between the another movable member and the outer member can be reduced before the another movable member is separated from the outer member.

In this aspect, the contact part may have a low friction region formed of the low friction material and an elastic region formed of the low friction material having lower stiffness than that of the low friction material. The another movable member may be provided to the inner member such that the outer member is in contact with both the low friction region and the elastic region when rotation of the rotation body is stopped. When the contact part of the another movable member is fully formed of low friction material, the reducing effect of friction is improved, however; sealing characteristics is easily degraded due to the influence of axial runout or the like at a low rotational speed before the another movable member gets separated from the outer member, since it is hard to be deformed. According to this aspect, since the outer member is in contact with both the low friction region and the elastic region before the another movable member gets separated from the outer member, such degradation of the sealing characteristics can be compensated, and frictional force can be reduced further than the case when the contact part is fully formed of elastic material.

In the oil seal of the present invention, a crankcase of an internal combustion engine may be provided as the stationary body, and a crankshaft of the internal combustion engine may be as the rotation body. According to this aspect, since the movable member is in contact with the outer member and the prescribed gap is closed even when the internal pressure in the crankcase becomes higher than atmospheric pressure due to the increase of load at a high speed rotation of the crankshaft, leakage of oil and blow-by gas in the crankcase can be reliably prevented Effect of Invention As described above, according to the present invention, the movable member, which is not in contact with the outer member when rotation of the rotation body is stopped, is displaced in the direction to approach the outer member and comes into contact with the outer member as the rotational speed of the rotation body increases. Since the prescribed gap is thus closed, leakage of oil due to the increase of the rotational speed of the rotation body can be prevented.

BEST MODE FOR CARRYING OUT THE INVENTION

First Embodiment

Figure 1:
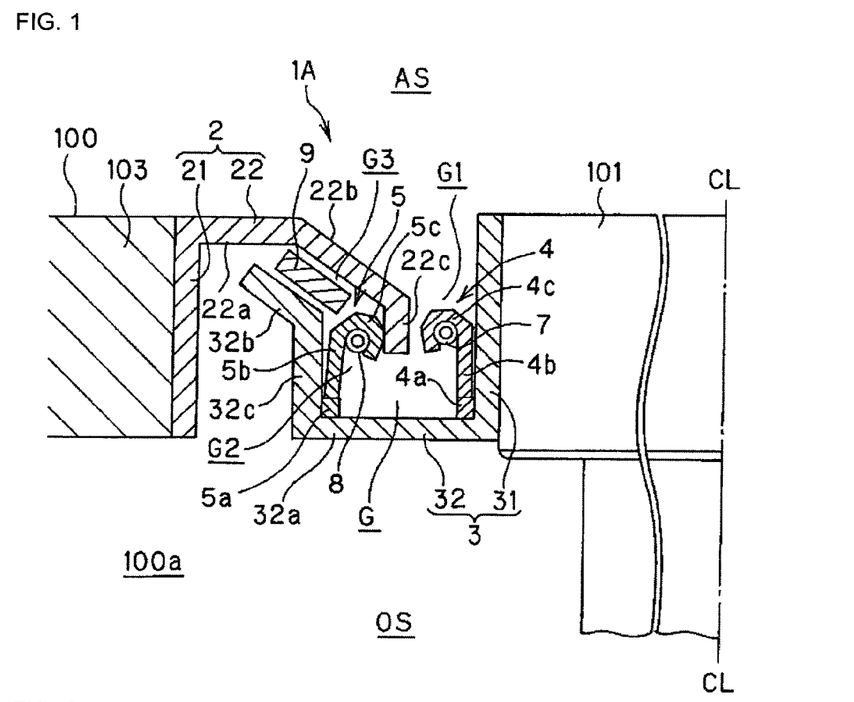
FIG. 1 is a schematic cross-sectional view showing a main part of an internal combustion engine to which an oil seal according to the first embodiment of the present invention is applied.

FIG. 1 is a schematic cross-sectional view showing a main part of an internal combustion engine in which an oil seal according to the first embodiment of the present invention is installed. It is noted that only a half of a cross section will be shown in FIG. 1 and other figures, since the oil seal according to the present invention is axially symmetric with respect to the axis CL. FIG. 1 shows a state of a crankshaft 101 when rotation is stopped, and the crankshaft 101 is attached to a crankcase 100 in a rotatable manner around the axis CL. The oil seal 1A is disposed between the crankcase 100 and the crankshaft 101, wherein the crankcase 100 serves as a stationary body and the crankshaft 101 serves as a rotation body. Namely, the oil seal 1A is fitted in an annular gap formed between the crankcase 100 and the crankshaft 101. The oil seal 1A separates an atmospheric side AS outside the crankcase 100 from a hermetically sealed side OS inside the crankcase 100, thereby to prevent the leakage of fluid such as oil and blow-by gas from the hermetically sealed side OS to the atmospheric side AS and to prevent intrusion of foreign matter such as dust from the atmospheric side AS to the hermetically sealed side OS. The oil seal 1A has an annular outer member 2 provided coaxially with the crankshaft 101 and an annular inner member 3, respectively. The outer member 2 is fitted to the crankcase 100 with the oil seal retainer 103 interposed therebetween, whereas the inner member 3 is integrally rotatably fitted to the crankshaft 101. The outer member 2 and the inner member 3 are assembled together with a separation from each other, such that a gap G is formed between them.

The outer member 2 has an outer cylinder 21 which is fixed to the oil seal retainer 103 and extends in the direction of the axis CL; and an inward flange 22 which extends radial inwardly from the end of the outer cylinder 21 at the atmospheric side AS. The inward flange 22 includes a vertical wall 22a which rises up radial inwardly and substantial vertically with respect to the outer cylinder 21; an inclined wall 22b which continues to the vertical wall 22a and is inclined toward the hermetically sealed side OS; and a side wall 22c which continues to the inclined wall 22b and extends in the direction of the axis CL. On the other hand, the inner member 3 has an internal cylinder 31 which is fixed to the crankshaft 101 and extends in the direction of the axis CL; and an outward flange 32 which extends radial outwardly from the end of the internal cylinder 31 at the hermetically sealed side OS. The outward flange 32 is disposed so as to oppose to the inward flange 22 of the outer member 2. Namely, the outward flange 32 includes a vertical wall 32a which rises up radial outwardly and substantially vertically with respect to the internal cylinder 31 and is substantially parallel to the vertical wall 22a of the inward flange 22; a side wall 32c which continues to the vertical wall 32a and extends in the direction of the axis CL and is substantially parallel to the side wall 22c of the inward flange 22; and an inclined wall 32b which continues to the side wall 32c and extends so as to be inclined toward the atmospheric side AS and is substantially parallel to the inclined wall 22b of the inward flange 22.

Among the gap G's formed between the outer member 2 and the inner member 3, an annular first movable lip 4 which serves as a movable member is disposed in the gap G1 formed between the side wall 22c of the inward flange 22 and the internal cylinder 31 of the inner member 3. The first movable lip 4 is formed of elastic material such as rubber, and has a base end 4a attached to the end of the internal cylinder 31 at the hermetically sealed side OS; a middle part 4b which extends from the base end 4a toward the atmospheric side AS; and a tip end 4c which is folded back radial outwardly from the middle part 4b toward. An annular garter spring 7 which urges the first movable lip 4 radial inwardly is attached to the tip end 4 *c*. In the state shown in FIG. 1 that rotation is stopped, the first movable lip 4 is kept in no contact with the outer member 2, that is, in the state the gap G1 is opened by the elastic force of the garter spring 7.

Furthermore, among the gap G's formed between the outer member 2 and the inner member 3, an annular second movable lip 5 which serves as another movable member is disposed in the gap G2 formed between the side wall 22c of the inward flange 22 and the side wall 32c of the outward flange 32. The second movable lip 5 is formed of elastic material such as rubber in the same manner as the first movable lip 4. The second movable lip 5 has a base end 5a which is attached to at the boundary between the vertical wall 32a of the outward flange 32 and the side wall 32c; a middle part 5b which extends from the base end 5a toward the atmospheric side AS; and a tip end 5c which is folded back radial inwardly from the middle part 5b. An annular garter spring 8 for urging the second movable lip 5 radial inwardly is attached to the tip end 5c. In the state shown in FIG. 1 that rotation is stopped, the second movable lip 5 is pressed against the outer member 2 by the elastic force of the garter spring 8, and is kept in a state the gap G2 is closed by the second movable lip 5.

Furthermore, among the gap G's formed between the outer member 2 and the inner member 3, a floating ring 9 is disposed in the gap G3 formed between the inclined wall 22b of the inward flange 22 and the inclined wall 32b of the outward flange 3. The floating ring 9 can move in the gap G3 in no contact with the outer member 2 and the inner member 3, respectively, while the crankshaft 101 is rotating. Namely, the floating ring 9 is structured to rotate concentrically with the inner member 3 at a slower speed than the circumferential velocity of the inner member 3 while the oil existing in the gap G3 is interposed between the floating ring 9 and the outer member 2 and between the floating ring 9 and the inner member 3, respectively. By considering the width of the gap G3, the thickness of the floating ring 9 is set such that labyrinth seals are formed between the three members of the floating ring 9, the outer member 2, and the inner member 3.

Figure 2:
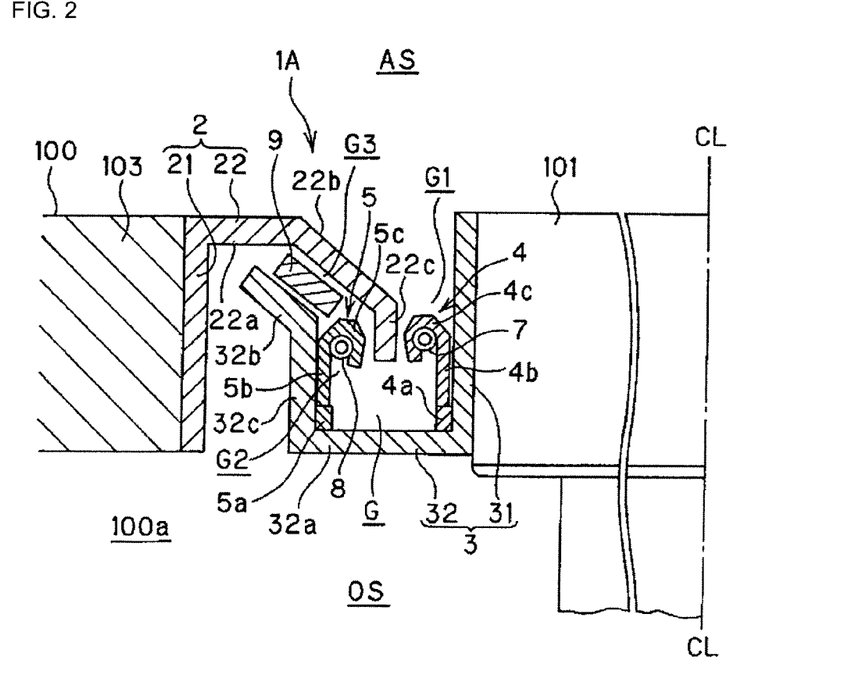
FIG. 2 is a view showing the oil seal of FIG. 1 when the crankshaft is in a rotating state.
Figure 3:
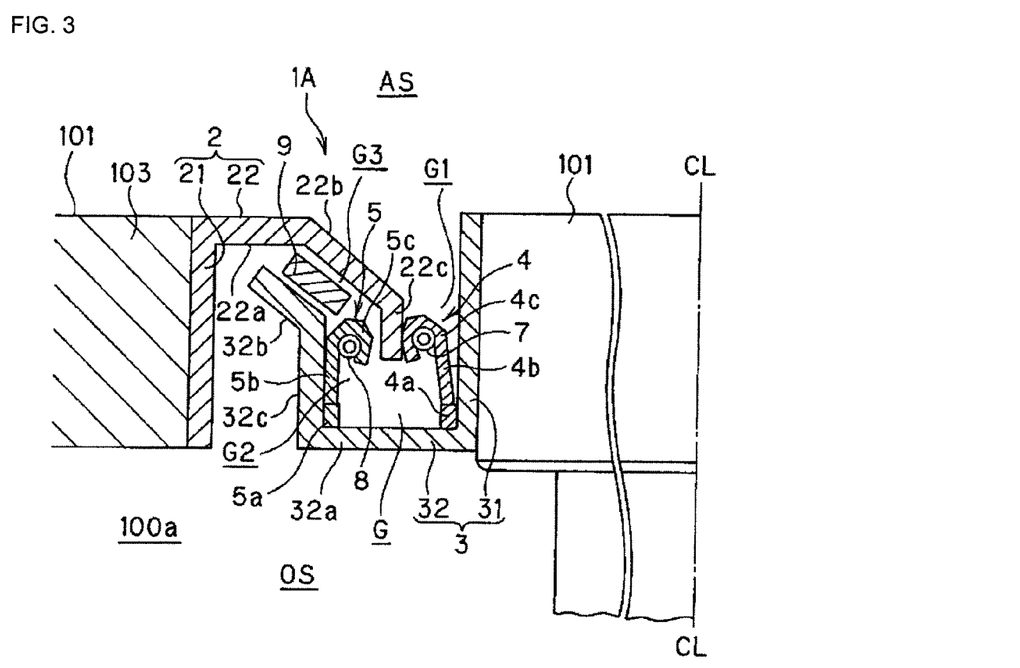
FIG. 3 is a view showing the oil seal of FIG. 1 when the rotational speed of the crankshaft is faster than that in FIG. 2.

FIG. 2 and FIG. 3 show the oil seal 1A when the crankshaft 101 is in a rotating state; and FIG. 3 shows a state the rotational speed of the crankshaft 101 is faster than that in the state of FIG. 2. Since the inner member 3 rotates integrally with the crankshaft 101 when the crankshaft 101 rotates, radial outwardly oriented centrifugal force exerts on the first movable lip 4. The centrifugal force increases in proportion to the rotational speed of the crankshaft 101. Thus, along with the rotational speed of the crankshaft 101 increases, the first movable lip 4 is displaced in the direction to approach the outer member 2, and the first movable lip 4 comes into contact with the outer member 2 as shown in FIG. 3. Accordingly, the gap G1 is closed by the first movable lip 4. Such behavior of the first movable lip 4 according to the variation in the rotational speed of the crankshaft 101 can be controlled freely, for example, by setting the specification such as an outer diameter and a spring constant of the garter spring 7 and the constituent material of the first movable lip 4 properly. For example, the first movable lip 4 can be structured so as to come into contact with the outer member 2 at an arbitrary targeted rotational speed of the crankshaft 101.

Furthermore, the radial outwardly oriented centrifugal force exerts also on the second movable lip 5 disposed in the gap G2 due to the rotation of the crankshaft 101. As a result of the increase of the centrifugal force as the rotational speed of the crankshaft 101 increases, the force of pressing the second movable lip 5 against the outer member 2 decreases gradually. Then, the second movable lip 5 is displaced in the direction of leaving from the outer member 2 as shown in FIG. 2, so that the gap G2 is opened. In the same manner as the first movable lip 4, the behavior of the second movable lip 5 can also be structured such that the second movable lip 5 is separated from the outer member 2 at an arbitrary targeted rotational speed of the crankshaft 101, by setting the specification such as an outer diameter and a spring constant of the garter spring 8 and the constituent material of the second movable lip 5 properly.

Second Embodiment

Figure 4:
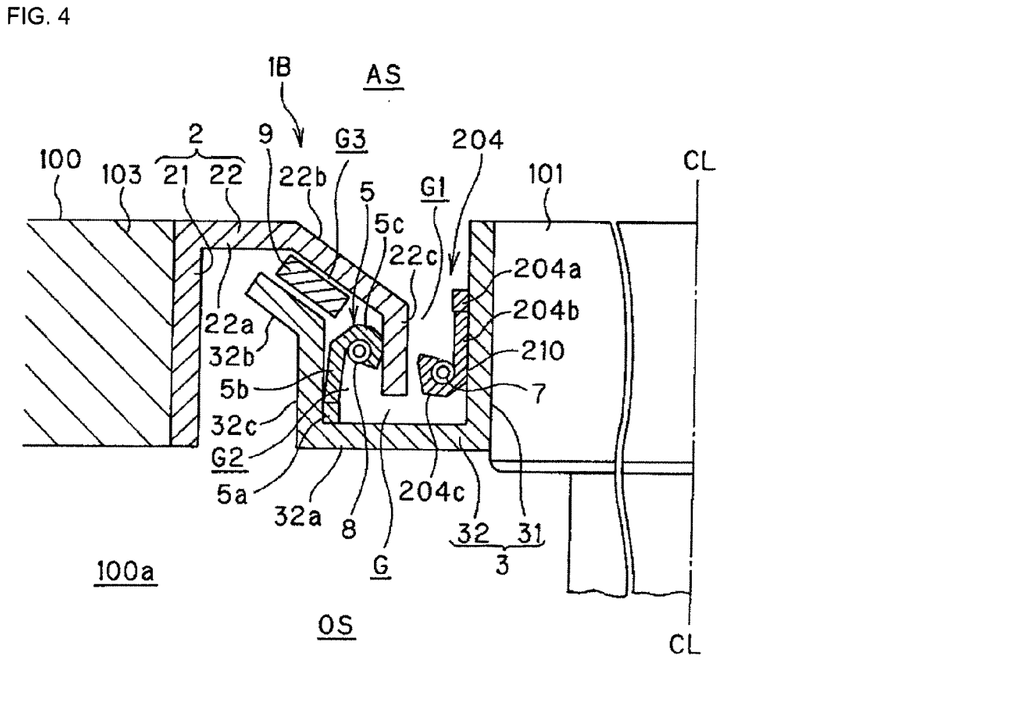
FIG. 4 is a schematic cross-sectional view showing a main part of an internal combustion engine to which an oil seal according to the second embodiment of the present invention is applied.
Figure 5:
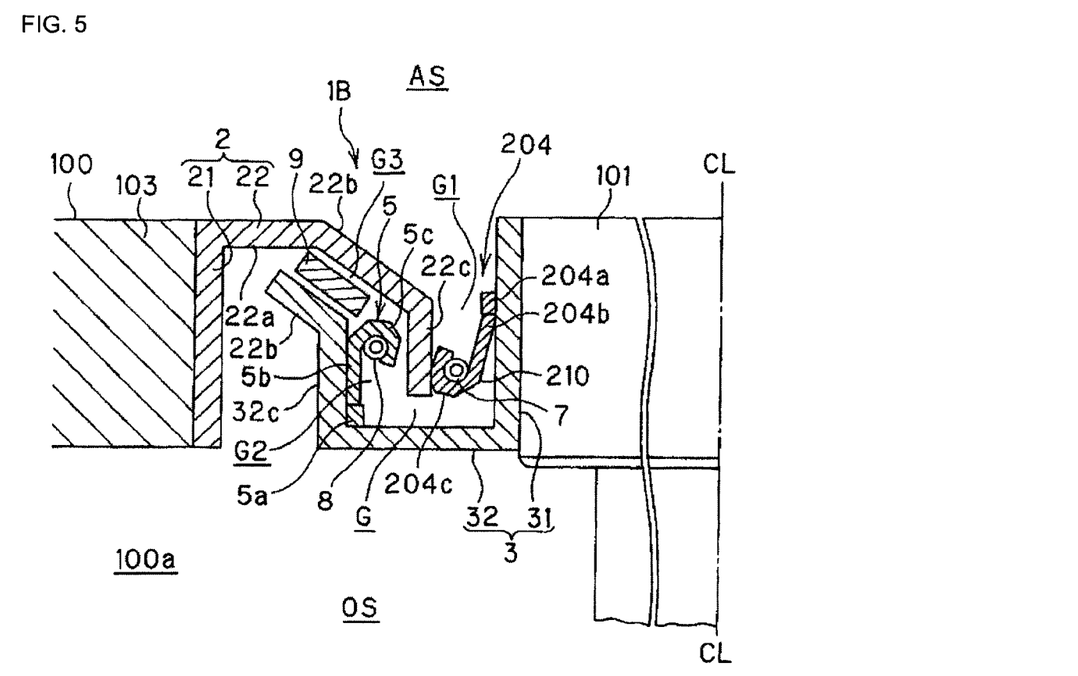
FIG. 5 is a view showing the oil seal of FIG. 4 when the crankshaft is rotating.

Next, the second embodiment of the present invention will be described with reference to FIG. 4 and FIG. 5. The oil seal 1B according to the embodiment has the same structure as that of the oil seal 1A of the first embodiment except for the structure of the first movable lip 204 which serves as a movable member. In FIG. 4 and FIG. 5, the same components as in the first embodiment have the same reference numbers. In the following, the duplicated description with the first embodiment will be omitted.

The oil seal 1B has an annular first movable lip 204 formed of elastic material such as rubber; and the first movable lip 204 includes a base end 204a attached to the internal cylinder 31 of the inner member 3, a middle part 204b which extends from the base end 204a toward the hermetically sealed side OS, and a tip end 204c which is folded back radial outwardly from the middle part 204b. In the oil seal 1B, when the first movable lip 204 is displaced in the direction to approach the outer member 2 as the rotational speed of the crankshaft 101 increases, the inner circumference surface 210 of the first movable lip 204 turns toward the hermetically sealed side OS as shown in FIG. 5. When pressure in the internal space 10a of the crankcase 100 (pressure at the hermetically sealed side OS) is higher than atmospheric pressure, the pressure exerts on the inner circumference surface 210 of the first movable lip 204, so that the first movable lip 204 receives the pressure and is urged in the direction to approach the outer member 2. Thus, the sealing effect of the first movable lip 204 is improved, since the first movable lip 204 can be pressed against the outer member 2 by utilizing the pressure in the internal space 100a. Accordingly, the inner circumference surface 210 of the first movable lip 204 works as the pressure receiving part of the present invention.

Third Embodiment

Figure 6:
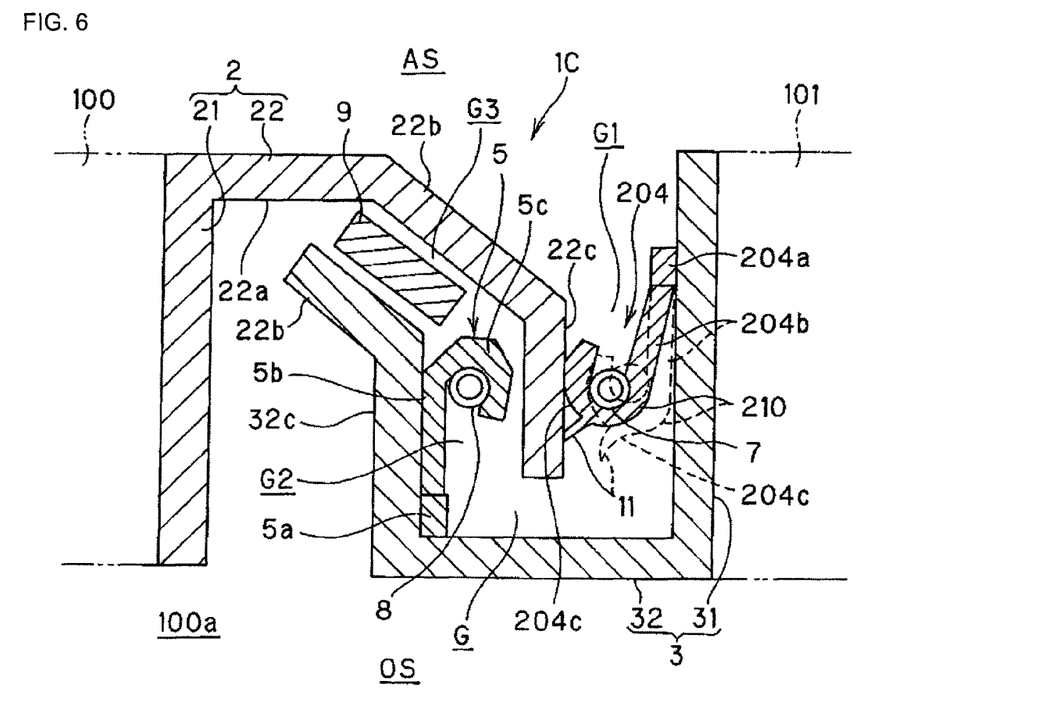
FIG. 6 is a schematic cross-sectional view showing a main part of an internal combustion engine to which an oil seal according to the third embodiment of the present invention is applied.

Next, the third embodiment of the present invention will be described with reference to FIG. 6. The oil seal 1C according to this embodiment is that of the second embodiment in which a skirt 11 is provided to the inner circumference surface 210 of the first movable lip 204, and corresponds to a variation of the oil seal 1B. In the following and in FIG. 6, the same components as in the second embodiment have the same reference numbers, and the duplicated description will be omitted. The skirt 11 of the oil seal 1C extends from the first movable lip 204 toward the hermetically sealed side OA. The skirt 11 is structured such that the tip end thereof comes into contact with the outer member 2 when the first movable lip 204 comes into contact with the outer member 2 as shown in FIG. 6 with the solid line. It is noted that when the crankshaft 101 stops rotating, the first movable lip 204 is kept in no contact with the outer member 2 as shown in FIG. 6 with broken line. According to this embodiment, since it gets easy to receive the pressure in the internal space 100a of the crankcase 100 when the skirt 11 is provided, the first movable lip 204 can be pressed more strongly against the outer member 2 by using the pressure. Thus, the sealing effect of the first movable lip 204 is further improved than in the second embodiment. In the oil seal 1C, the inner circumference surface 210 of the first movable lip 204 and the skirt 11 work as the pressure receiving part of the present invention.

Fourth Embodiment

Figure 7:
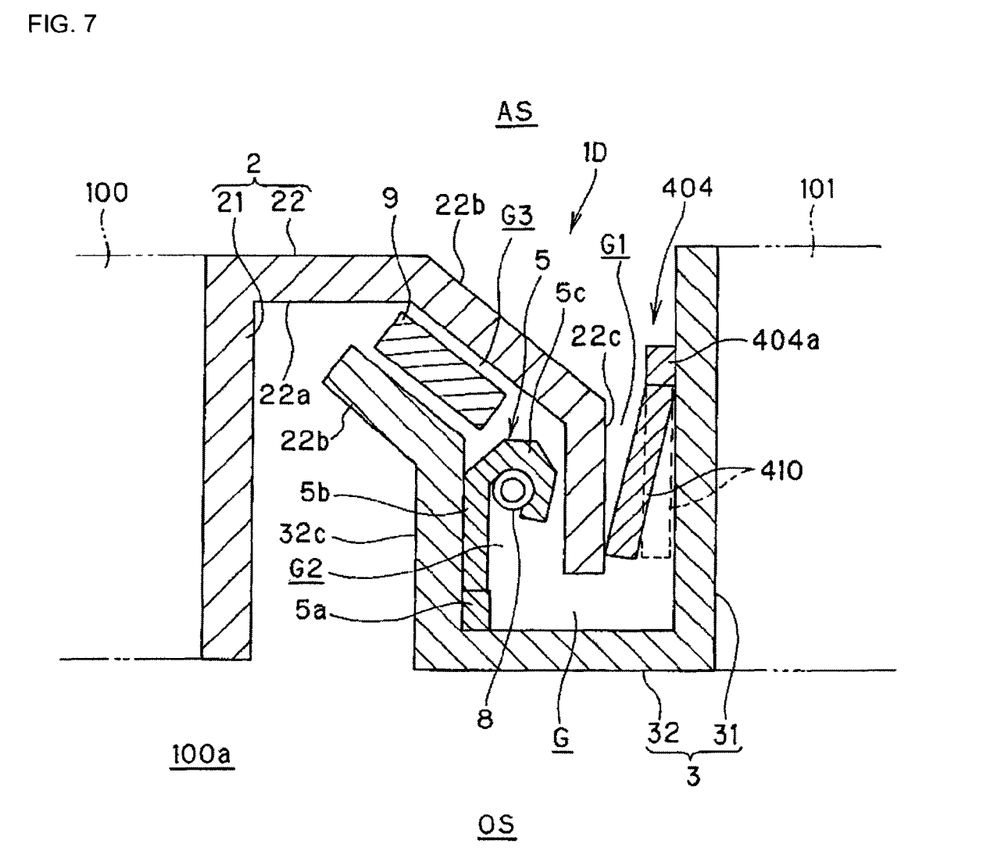
FIG. 7 is a schematic cross-sectional view showing a main part of an internal combustion engine to which an oil seal according to the fourth embodiment of the present invention is applied.

Next, the fourth embodiment of the present invention will be described with reference to FIG. 7. The oil seal 1D according to this embodiment has an annular first movable lip 404 which is formed of elastic material such as rubber. The first movable lip 404 has a base end 404a attached to the internal cylinder 31 of the inner member 3, and is structured so as to extend from its base end 404a toward the hermetically sealed side OS. Unlike the above-mentioned embodiments, no garter spring is attached to the first movable lip 404 at its tip end. Namely, the first movable lip 404 is kept in no contact with the outer member 2 by its own elastic force as shown in FIG. 7 with broken line, when the crankshaft 101 stops rotating. Then, when the rotational speed of the crankshaft 101 increases, the centrifugal force generated along with the rotation overcomes the elastic force of the first movable lip 404, and thus the first movable lip 404 is displaced in the direction to approach the outer member 2 as shown in FIG. 7 with the solid line, and comes into contact with the outer member 2. Since the structure of the first movable lip 404 is more simplified than those in the above-mentioned embodiments it can contribute to the reduction of cost. The inner circumference surface 410 of the first movable lip 404 of this embodiment turns toward the hermetically sealed side OS, when the first movable lip 404 is displaced in the direction to approach the outer member 2. Thus, in the same manner as the second and the third embodiments, the inner circumference surface 410 can press the first movable lip 404 against the outer member 2 by utilizing the pressure in the internal space 100a of the crankcase 100; and the inner circumference surface 410 works as the pressure receiving part of the present invention. Nevertheless, the orientation along which the first movable lip 404 extends may be opposite to that in FIG. 7. Namely, in the same manner as the first embodiment, it may be structured so as to extend from the base end 404a toward the atmospheric side AS.

Fifth Embodiment

Figure 8:
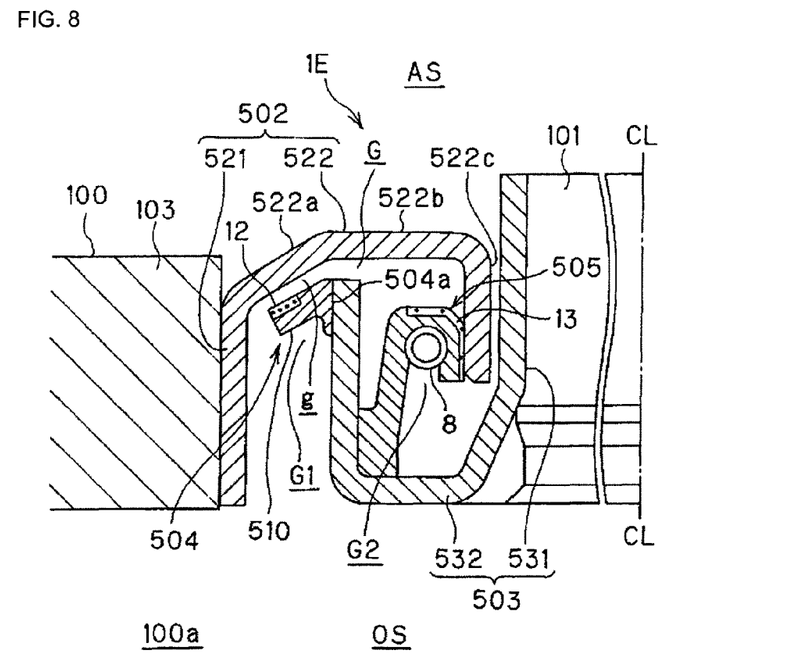
FIG. 8 is a schematic cross-sectional view showing a main part of an internal combustion engine to which an oil seal according to the fifth embodiment of the present invention is applied.
Figure 9:
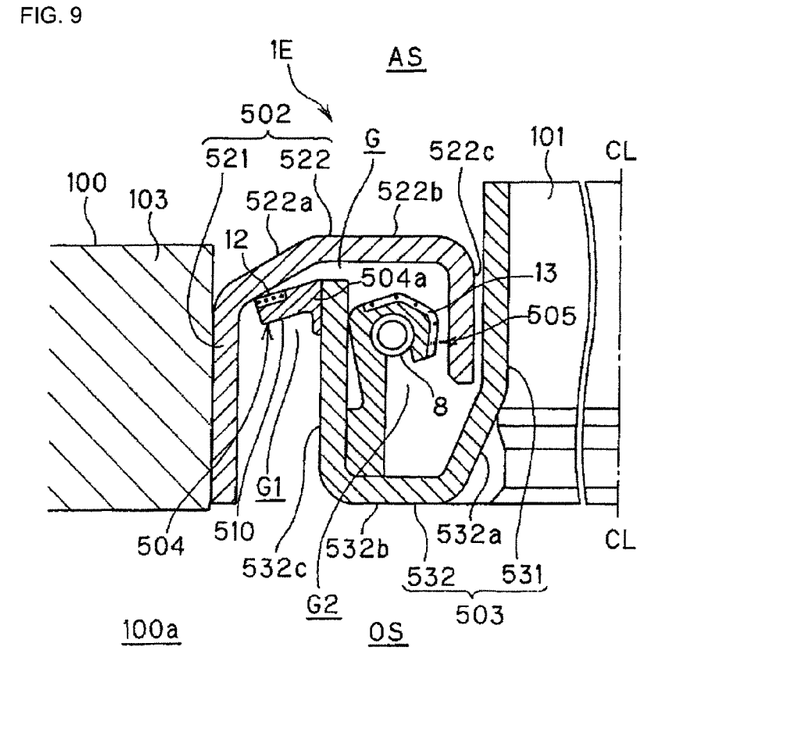
FIG. 9 is a view showing the oil seal of FIG. 8 when the crankshaft is rotating.

Next, the fifth embodiment of the present invention will be described with reference to FIG. 8 and FIG. 9. As shown in FIG. 8, the oil seal 1E according to this embodiment has an annular outer member 502 provided coaxially with the crankshaft 101 and an inner member 503, respectively. The outer member 502 is fitted to the crankcase 100 via the oil seal retainer 103, whereas the inner member 503 is integrally rotatably fitted to the crankshaft 101. In the same manner as the above-mentioned embodiments, the outer member 502 and the inner member 503 are assembled together with a separation from each other, such that a gap G is formed between them.

The outer member 502 has an outer cylinder 521 which is fixed to the oil seal retainer 103 and extends in the direction of the axis CL; and an inward flange 522 which extends radial inwardly from the end of the outer cylinder 521 at the atmospheric side AS. The inward flange 522 includes an inclined wall 522a which is inclined from the end of the outer cylinder 521 at the atmospheric side AS toward the atmospheric side AS; a horizontal wall 522b which continues to the inclined wall 522a and extends radial inwardly; and a side wall 522c which continues to the horizontal wall 522b and extends in the direction of the axis CL. On the other hand, the inner member 503 has an internal cylinder 531 which is fixed to the crankshaft 101 and extends in the direction of the axis; and an outward flange 532 which extends radial outwardly from the end of the internal cylinder 31 at the hermetically sealed side OS. The outward flange 532 has an inclined wall 532a which is inclined form the end of the internal cylinder 531 at the hermetically sealed side OS toward the hermetically sealed side OS; a horizontal wall 532b which continues to the inclined wall 532a and extends radial outwardly; and a side wall 532c which continues to the horizontal wall 532b and extends in the axial direction.

Among the gap G's formed between the outer member 502 and the inner member 503, an annular first movable lip 504 which serves as movable member is disposed in the gap G1 formed between the inclined wall 522a of the inward flange 522 and the side wall 532c of the outward flange 532. The first movable lip 504 is formed of elastic material such as rubber, and has a base end 504a attached to the end of the outward flange 532 of the side wall 532c at the atmospheric side AS. The first movable lip 504 is structured so as to extend from the base end 4a in substantially parallel to the inclined wall 522a of the inward flange 522. In the same manner as the fourth embodiment, no garter spring is attached to the tip end of them. Accordingly, the first movable lip 504 is kept in no contact with the outer member 502 by its own elastic force as shown in FIG. 8, when the crankshaft 101 stops rotating. Then, when the rotational speed of the crankshaft 101 increases, the centrifugal force generated due to the rotation overcomes the elastic force of the first movable lip 504, and thus the first movable lip 504 is displaced in the direction to approach the outer member 502 and comes into contact with the outer member 502 as shown in FIG. 9. In the same manner as the second to the fourth embodiments, the inner circumference surface 510 of the first movable lip 504 turns toward the hermetically sealed side OS when the first movable lip 504 is displaced in the direction to approach the outer member 502. Accordingly, the inner circumference surface 510 of the first movable lip 504 receives the pressure in the internal space 100a of the crankcase 100, and can urge the first movable lip 504 in the direction to approach the outer member 502. Thus, the inner circumference surface 510 of the movable lip 504 works as the pressure receiving part of the present invention.

Among the gap G's formed between the outer member 502 and the inner member 503, an annular second movable lip 505 which serves as another movable member is disposed in the gap G2 formed between the side wall 522c of the inward flange 522 and the side wall 532c of the outward flange 532. The second movable lip 505 has the same structure as that of the second movable lip of each of the above-mentioned embodiments. When the crankshaft 101 stops rotating, the second movable lip 505 is pressed against the outer member 502 by the elastic force of the garter spring 8 and is kept in a state the gap G2 is closed by the second movable lip 505 as shown in FIG. 8. Then, when the rotational speed of the crankshaft 101 increases, the second movable lip 505 is displaced by the centrifugal force generated due to the rotation in the direction of leaving from the outer member 502 as shown in FIG. 9, so that the gap G2 is opened.

In this embodiment, the contact part 12 on which the first movable lip 504 comes into contact with the outer member 502 is formed of low friction material having lower friction coefficient than that of other parts thereof (the first movable lip 504). As the low friction material, for example, fluorine resin such as polytetrafluoroethylene (PTFE) and diamond like carbon (DLC) can be used. Accordingly, since the frictional resistance due to the contact is reduced when the outer member 502 is in contact with the first movable lip 505, leakage of oil can be reliably prevented while suppressing the increase of loss of torque. The contact part 13 of the second movable lip 505 is also formed of low friction material in a same way. Furthermore, the outer member 502 which is in contact with the first movable lip 504 and the second movable lip 505 can be formed of the above-mentioned low friction material. Namely, the contact part of the outer member 502 which is contact with the first movable lip 504 or the second movable lip 505 may be formed of the low friction material. It is noted that the contact part of the movable lip according to any of the above-mentioned embodiments can be formed of the above-mentioned low friction material.

Furthermore, in this embodiment, the gap g between the first movable lip 504 and the outer member 2 is set such that a labyrinth seal capable of suppressing leakage of oil is formed between the first movable lip 504 and the outer member 2 when the first movable lip 504 and outer member 2 are not in contact with each other. The width of the gap g is set properly according to the pressure which can be generated in the internal space 100a of the crankcase 100. Thus, even when the first movable lip 504 is not in contact with the outer member 502, leakage of oil is suppressed by the labyrinth seal formed by the outer member 502 and the first movable lip 504. Accordingly, in the same manner as the above-mentioned embodiments, leakage of oil can be prevented effectively over the speed range from a low rotational speed of the crankshaft 101 before the gap G1 is closed by the first movable lip 504 to the high rotational speed of the crankshaft 101 after the gap G1 is closed by the first movable lip 504 without providing with a separate part such as a floating ring and without increasing number of parts.

Sixth Embodiment

Next, the sixth embodiment of the present invention will be described with reference to FIG. 10 to FIG. 12. The sixth embodiment corresponds to a variation of the fifth embodiment. The common parts between the sixth embodiment and the fifth embodiment have the same reference numbers in these figures; and the duplicated description will be omitted.

As shown in these figures, the oil seal 1F includes a first movable lip 604, which serves as a movable member and has a contact part 14 that comes into contact with the outer member 502. The contact part 14 of the first movable lip 604 has a low friction region 14a formed of the above-mentioned low friction material having lower friction coefficient than that of the other parts thereof; and an elastic region 14b formed of elastic material having lower stiffness than that of the low friction material. The low friction region 14a is disposed at the tip end side of the first movable lip 604, whereas the elastic region 14b is disposed at the side of a base end 604a of the first movable lip 604, these regions are adjacent to each other. The elastic region 14b has lower stiffness than the low friction region 14a and is deformed easily. Thus, when the elastic region 14b is in contact with the outer member 502, the sealing characteristics is better than when the low friction region 14a is in contact with the outer member 502. It is noted that the rubber made from polyamide or the like is suited for the elastic material.

Figure 10:
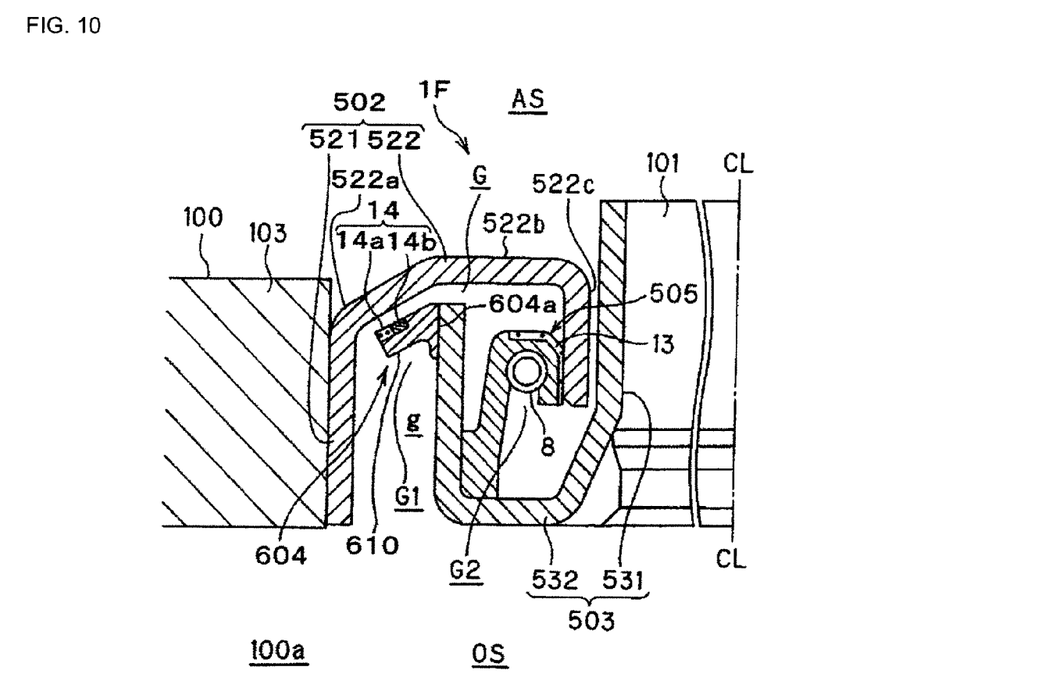
FIG. 10 is a schematic cross-sectional view showing a main part of an internal combustion engine to which an oil seal according to the sixth embodiment of the present invention is applied.
Figure 11:
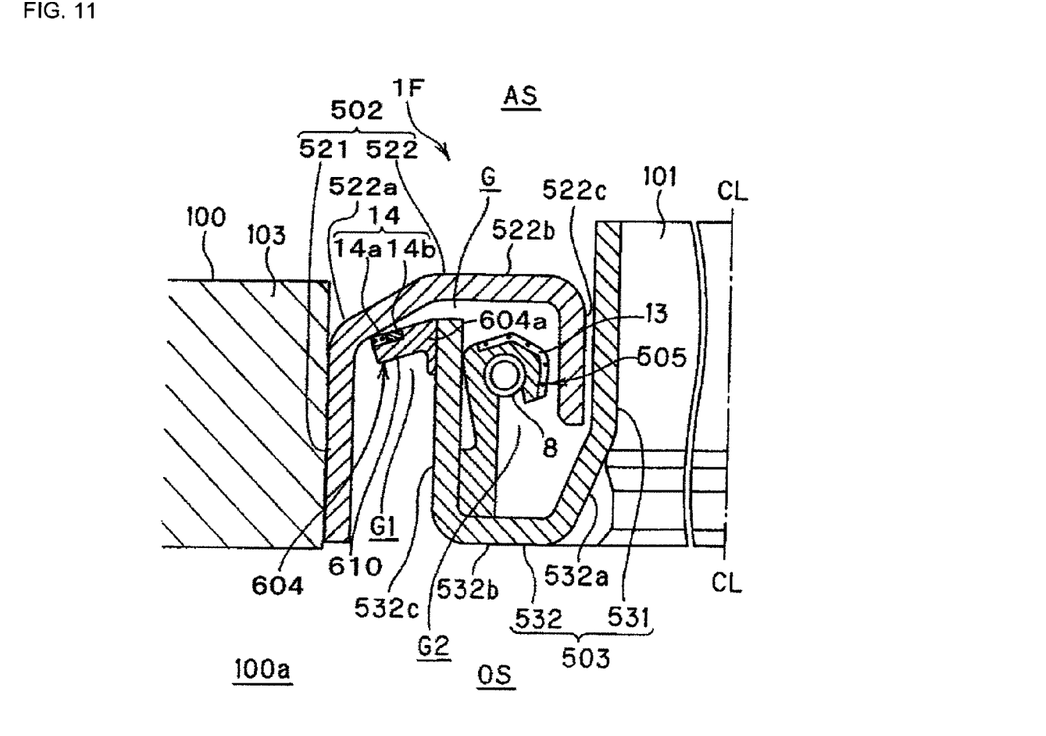
FIG. 11 is a view showing the oil seal of FIG. 10 when the crankshaft is rotating.
Figure 12:
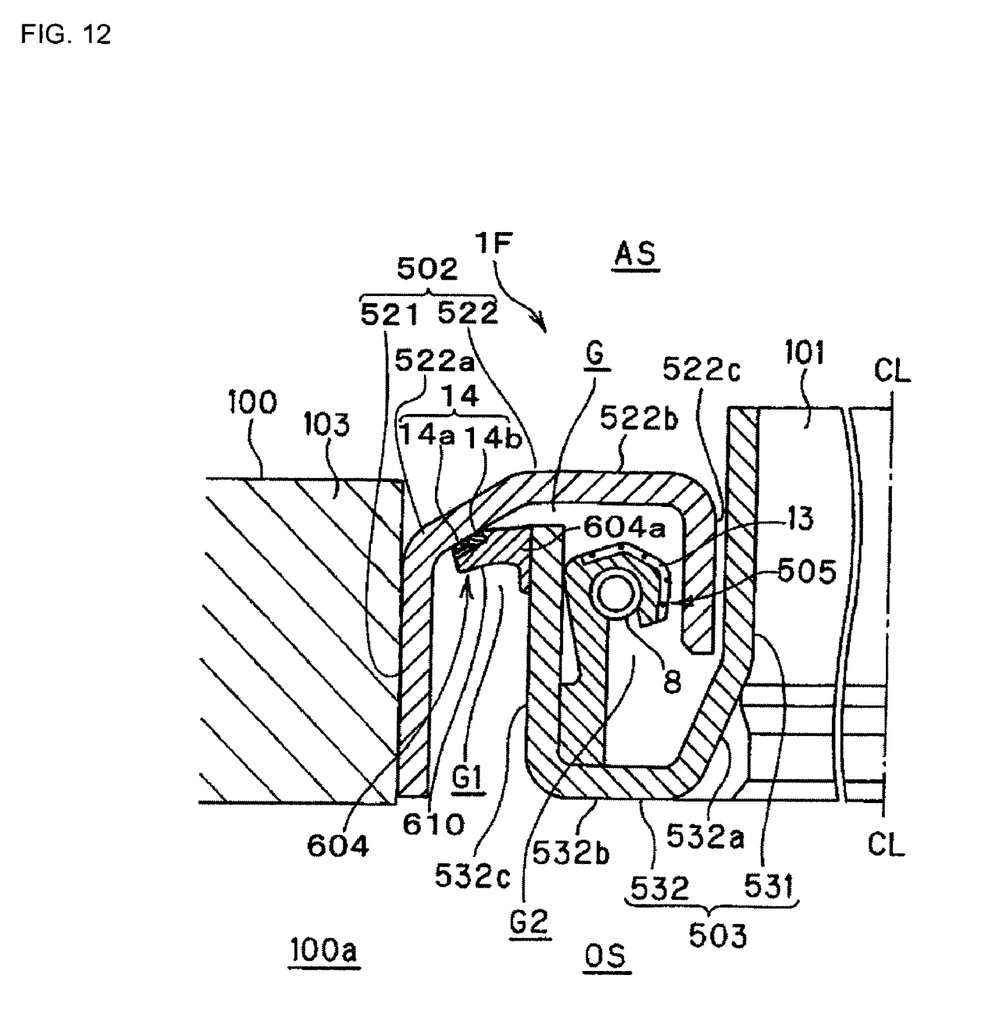
FIG. 12 is a view showing the oil seal of FIG. 10 when the rotational speed of the crankshaft is faster than that in FIG. 11.

When the rotational speed of the crank shaft 101 increases, the oil seal 1F changes from the state of FIG. 10 to the state of FIG. 11. In the state of FIG. 11, the first movable lip 604 is displaced to a position where the outer member 502 is in contact with the low friction region 14a of the contact part 14 but the outer member 502 is not in contact with the elastic region 14b of the contact part 14. Then, when the rotational speed of the crank shaft 101 increases further from the state of FIG. 11, the movable lip 604 is displaced to a position where the outer member 502 is in contact with both the low friction region 14a and the elastic region 14b as shown in FIG. 12.

According to this embodiment, resistance to friction can be reduced when the low friction region 14a is in contact with the outer member 502 in the state of FIG. 11. When the rotational speed of the crank shaft 101 increases further than that of FIG. 11, the pressure in the internal space 100a of the crankcase 100 increases, however; sealing characteristics is improved since the outer member 502 is in contact with both the low friction region 14a and the elastic region 14b as shown in FIG. 12. Thus, leakage of oil can be reliably prevented, for example, even when the pressure in the internal space 100a of the crankcase 100 becomes extraordinarily high for any reason. At the same time, intrusion of foreign matter from outside can also be prevented. It is noted that the inner circumference surface 610 of the first movable lip 604 also serves as the pressure receiving part of the present invention.

Seventh Embodiment

Figure 13:
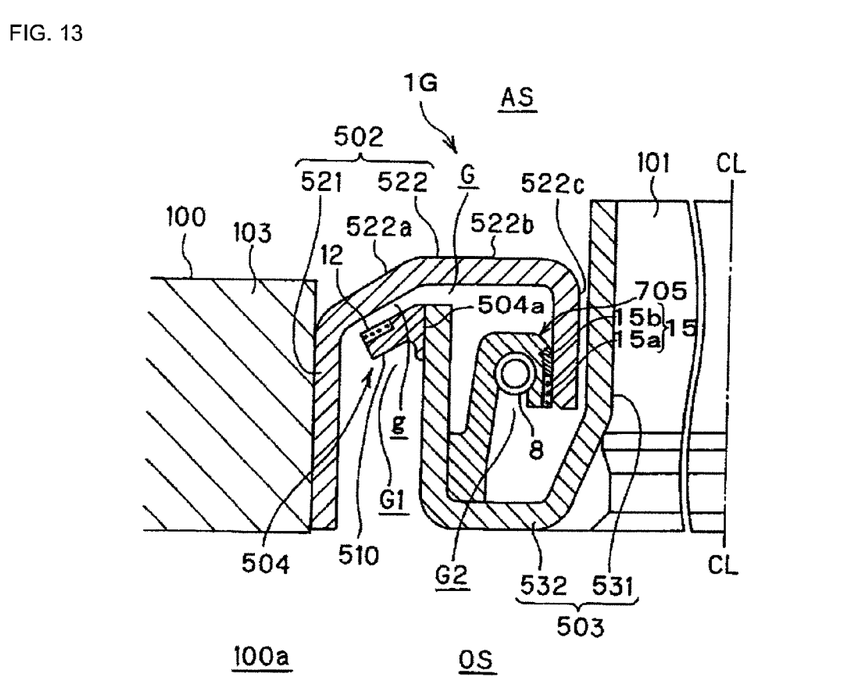
FIG. 13 is a schematic cross-sectional view showing a main part of an internal combustion engine to which an oil seal according to the seventh embodiment of the present invention is applied.
Figure 14:
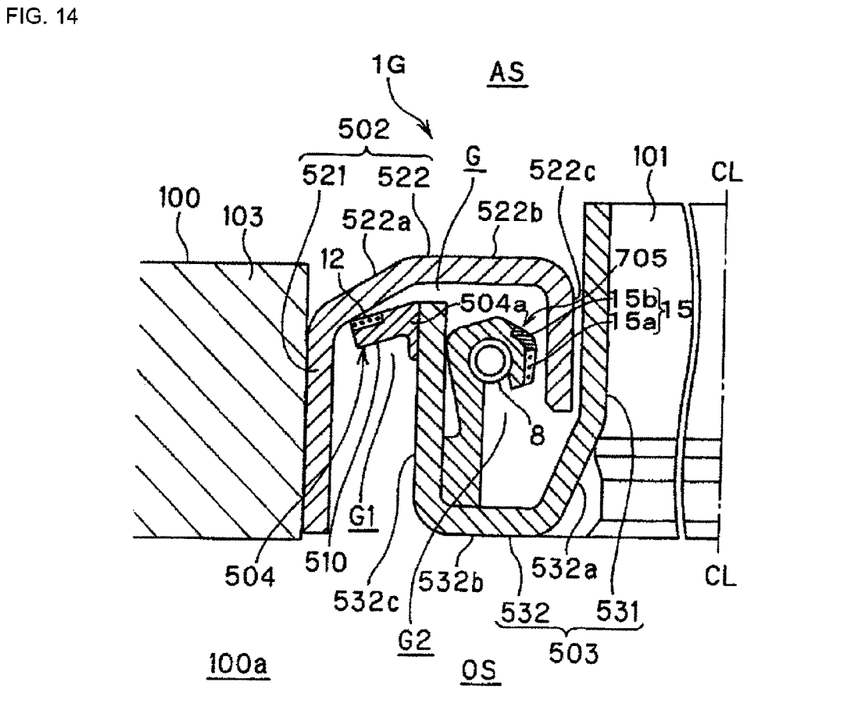
FIG. 14 is a view showing the oil seal of FIG. 13 when the crankshaft is rotating.

Next, the seventh embodiment of the present invention will be described with reference to FIG. 13 and FIG. 14. The seventh embodiment corresponds to a variation of the fifth embodiment. The common parts between the seventh embodiment and the fifth embodiment have the same reference number in these figures; and the duplicated description will be omitted. As shown in these figures, the oil seal 1G has a second movable lip 705 which serves as another movable member having a contact part 15 which comes into contact with the outer member 502. The contact part 15 of the second movable lip 705 has a low friction region 15a formed of the above-mentioned low friction material having lower friction coefficient than the other parts of the second movable lip 705 and an elastic region 15b formed of elastic material having lower stiffness than that of the low friction material. These regions are placed side-by-side. Before the second movable lip 705 is separated from the outer member 502 as shown in FIG. 13, for example, when the crank shaft 101 stops rotating, the second movable lip 705 is provided to the inner member 503 such that the outer member 502 is in contact with both the low friction region 15a and the elastic region 15b. When the rotational speed of the crank shaft 101 increases, the second movable lip 705 gets in a separated state from the outer member 502 as shown in FIG. 14.

Since the variation in torque is large and axial runout is also large at a low rotational speed before the second movable lip 705 is separated from the outer member 502 or when rotation is stopped, the second movable lip 705 is easily separated from the outer member 502. When the contact part 15 is fully formed of low friction material, the reducing effect of friction is improved, however; their sealing characteristics are easily degraded at a low rotational speed when axial runout or the like tends to occur. In this embodiment, since the outer member 502 contacts with both the low friction region 15a and the elastic region 15b, the degradation of the sealing characteristics can be compensated and the frictional force can be reduced further than the case when the contact part 15 is fully formed of elastic material. It is noted that this embodiment can be embodied in combination with the sixth embodiment shown in FIG. 10.

Eighth Embodiment

Next, the eighth embodiment of the present invention will be described with reference to FIG. 15 to FIG. 17. The eighth embodiment corresponds to a variation of the fifth embodiment. The common parts between the seventh embodiment and the fifth embodiment have the same reference numbers in these figures; and the duplicated description will be omitted. As shown in these figures, the outer member 502 of the oil seal 1H is provided with an auxiliary elastic part 16 which opposed to the contact part 12 of the first movable lip 504. The auxiliary elastic part 16 is formed in an annular shape and is formed of elastic material having lower stiffness than that of the constituent material of the outer member 502. In order to contact with the first movable lip 504 more tightly, the elastic member 16 is structured in a form having a wedge shape cross section such that it becomes gradually thinner toward radial outwardly. Since the auxiliary elastic part 16 is formed of elastic material having lower stiffness than that of the constituent material of the outer member 502, the sealing characteristics are improved further in a case when it contacts with the outer member 502 with the auxiliary elastic member 16 interposed than the case when the contact part 12 contacts with the outer member 502 itself.

Figure 15:
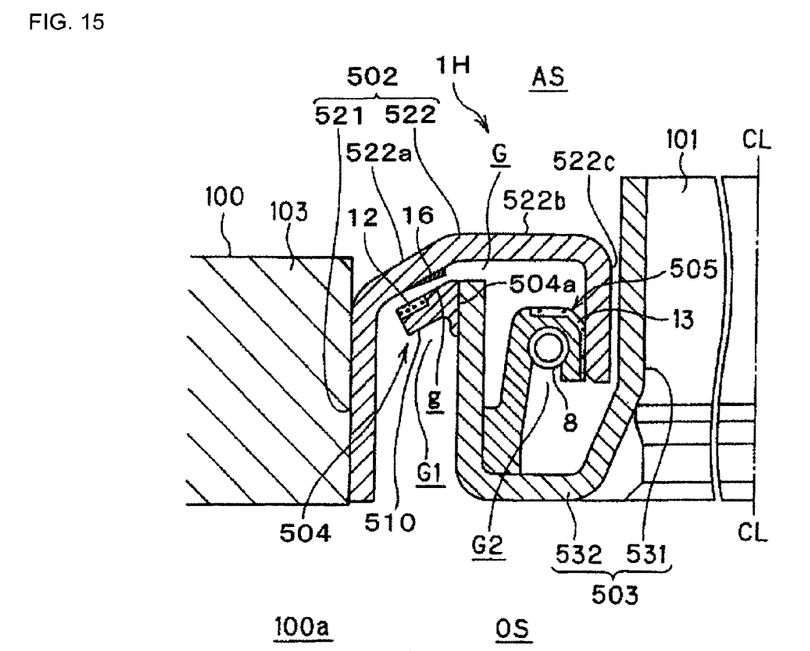
FIG. 15 is a schematic cross-sectional view showing a main part of an internal combustion engine to which an oil seal according to the eighth embodiment of the present invention is applied.

When the rotational speed of the crank shaft 101 increases, the oil seal 1H changes from the state of FIG. 15 to the state of FIG. 116. In the state of FIG. 15, the first movable lip 504 is displaced to a position where the outer member 502 is contact with the contact part 12 but the outer member 502 is not contact with the auxiliary elastic part 16. Then, when the rotational speed of the crank shaft 101 increases further from the state of FIG. 16, the movable lip 504 is displaced to the position where the contact part 12 contact with the auxiliary elastic part 16 as shown in FIG. 17.

Figure 16:
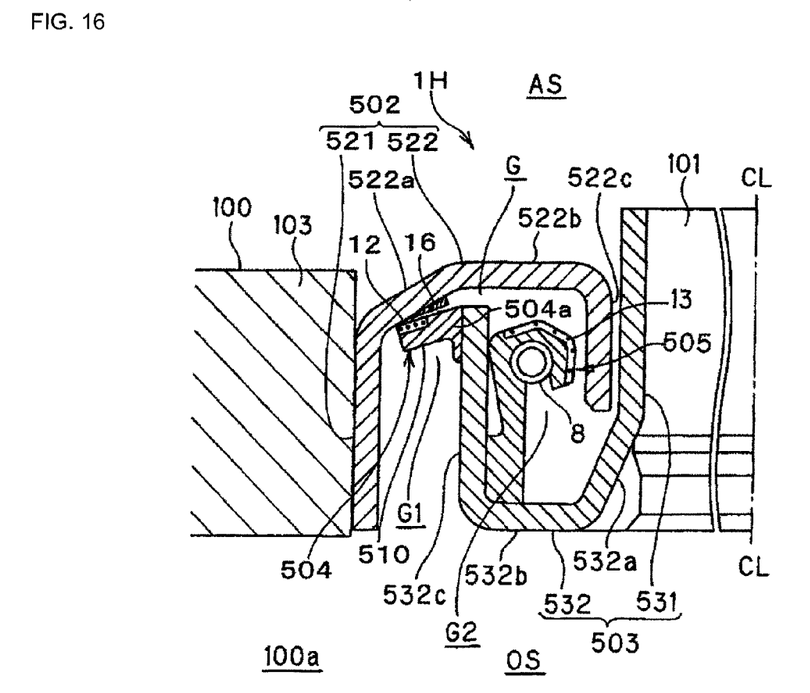
FIG. 16 is a view showing the oil seal of FIG. 15 when the crankshaft is rotating.
Figure 17:
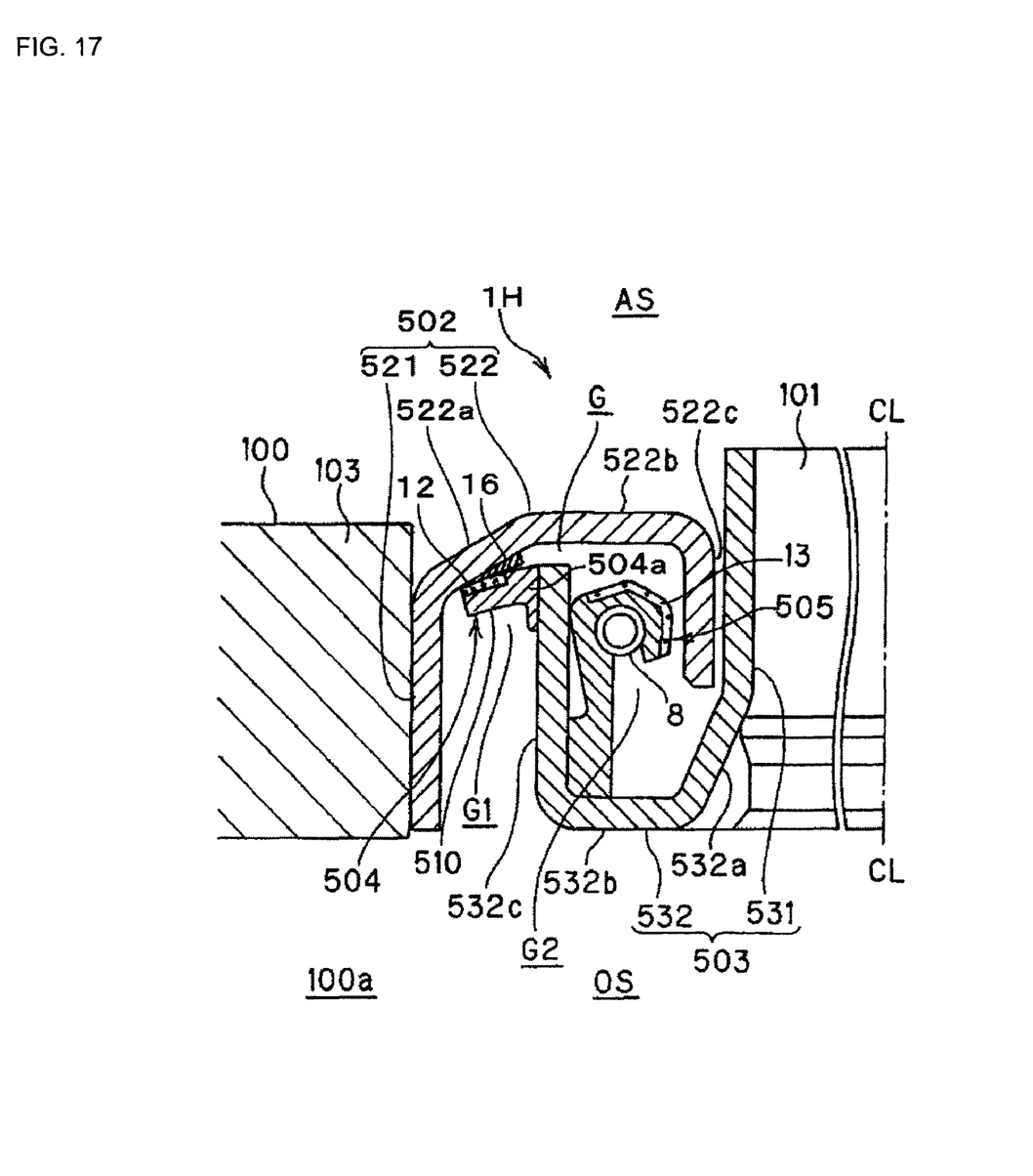
FIG. 17 is a view showing the oil seal of FIG. 15 when the rotational speed of the crankshaft is faster than that in FIG. 16.

In this embodiment, frictional resistance can be reduced, when the contact part 12 contact with the outer member 502 in the state of FIG. 16. When the rotational speed of the crank shaft 101 increases further than the state of FIG. 16, the pressure in the internal space 100a of the crankcase 100 increase, however; since the contact part 12 is in contact with the auxiliary elastic part 16 as shown in FIG. 17, the sealing characteristics is improved. Accordingly, even when the pressure in the internal space 100a of the crankcase 100 becomes extraordinarily high for any reason, for example, leakage of oil can be reliably prevented. At the same time, intrusion of foreign matter from outside can be prevented, too. Furthermore, since the auxiliary elastic part 16 is provided to the stationary outer member 502, increase of the weight of the first movable lip 504 can be avoided. Thus, the sealing characteristics can be improved while keeping the response of the first movable lip 504. It is noted that this embodiment can be embodied in combination with the sixth embodiment shown in FIG. 10 or the seventh embodiment shown in FIG. 13. Furthermore in this embodiment, the auxiliary elastic part 16 may be disposed such that the contact part 12 comes into contact with the auxiliary elastic part 16 without going through the state of FIG. 17 when the first movable lip 504 is displaced as the rotational speed of the crank shaft 101 increases.

The present invention is not limited to the above-mentioned embodiments; and it can be embodied in various forms within the spirit and scope of the present invention. For example, the oil seal according to the present invention can be also applied to various pumps in addition to the internal combustion engine. In a case that the oil seal according to the present invention is applied to a pump, the oil seal according to the present invention may be disposed between a pump housing which serves as the stationary body and a pump shaft rotatable attached to the pump housing.

Furthermore, the second movable lip is not an essential part in the above embodiments; and the present invention may be embodied in an embodiment in which the second movable lip is omitted. Even in this case, the first movable lip comes into contact with the outer member as the rotational speed of the rotation body increases, so that the gap is closed, leakage of oil along with the increase of rotational speed of the rotation body can be prevented.

The invention claimed is:

1. An oil seal disposed between a stationary body and a rotation body which is rotatably attached to the stationary body, comprising:
    an outer member fitted to the stationary body;
    an inner member which is integrally rotatably fitted to the rotation body and is assembled together with the outer member such that a prescribed gap is formed between the inner member and the outer member;
    a movable member which is disposed in the prescribed gap, wherein the movable member is provided to the inner member such that it is not in contact with the outer member when rotation of the rotation body is stopped and that it is displaced in the direction to approach the outer member, coming into contact with the outer member to close the prescribed gap as the rotational speed of the rotation body increases; and
    another movable member which is disposed in the prescribed gap, wherein:
    the another movable member is provided to the inner member such that the another movable member is in contact with the outer member and the prescribed gap is closed when rotation of the rotation body is stopped, and
    the another movable member is displaced in the direction to be separated from the outer member such that the prescribed gap is opened as the rotational speed of the rotation body increases,
    the another movable member has a contact part which contacts the outer member,
    the contact part is formed of low friction material having lower friction coefficient than that of the other parts thereof,
    the contact part has a low friction region formed of low friction material and an elastic region formed of elastic material having lower stiffness than that of the low friction material, and
    the another movable member is provided to the inner member such that the outer member is in contact with both the low friction region and the elastic region when rotation of the rotation body is stopped.

2. The oil seal according to claim 1, wherein the movable member is provided with a pressure receiving part which receives pressure in the internal space of the stationary body and urges the movable member in the direction to approach.

3. The oil seal according to claim 2, wherein the pressure receiving part comprises a skirt which comes into contact with the outer member when the movable member comes into contact with the outer member.

4. The oil seal according to claim 1, wherein the gap between the movable member and the outer member is provided such that labyrinth seal able to suppress leakage of oil is formed between the movable member and the outer member when the movable member is not in contact with the outer member.

5. The oil seal according to claim 1, wherein
    a floating ring which is movable in no contact with both the outer member and the inner member is disposed in the prescribed gap.

6. The oil seal according to claim 1, wherein
    the movable member has another contact part which comes into contact with the outer member, and
    the another contact part is formed of another material having a lower friction coefficient than that of other parts of thereof.

7. The oil seal according to claim 1, wherein
    the outer member has another contact part which comes into contact with the movable member, and
    the another contact part is formed of another low friction material having lower friction coefficient than that of other parts of the outer member.

8. The oil seal according to claim 6, wherein
    the another contact part has a low friction region formed of the another low friction material and an elastic region formed of another elastic material having lower stiffness than that of the another low friction material, and
    both the low friction region and the elastic region of the another contact part are disposed respectively on the another contact part such that, as the rotational speed of the rotation body increases, the movable member changes from the state where the low friction region of the movable member is in contact with the outer member but the elastic region of the movable member is not in contact with the outer member to the state where both the low friction region and the elastic region of the movable member are in contact with the outer member.

9. The oil seal according to claim 6, wherein
    the outer member is provided with an auxiliary elastic part which opposes the another contact part of the movable member and is formed of elastic material having lower stiffness than that of a constituent material of the outer member, and
    the movable member is displaced such that the another contact part comes into contact with the auxiliary elastic part as the rotational speed of the rotation body increases.

10. The oil seal according to claim 1, wherein
    a crankcase of an internal combustion engine is provided as the stationary body, and
    a crankshaft of the internal combustion engine is provided as the rotation body.

* * * * *